United States Patent [19]

Kalka

[11] 4,115,640

[45] Sep. 19, 1978

[54] AFTERTREATMENT OF SPRAY DRIED, POWDERED VINYL CHLORIDE EMULSION POLYMERIZATES

[75] Inventor: Josef Kalka, Herten, Fed. Rep. of Germany

[73] Assignee: Chemische Werke Hüls AG, Marl, Fed. Rep. of Germany

[21] Appl. No.: 722,397

[22] Filed: Sep. 13, 1976

[30] Foreign Application Priority Data

Sep. 13, 1975 [DE] Fed. Rep. of Germany ....... 2541008

[51] Int. Cl.$^2$ ............................................... C08F 6/02
[52] U.S. Cl. ............................... 528/483; 260/31.8 R; 526/81; 526/317; 526/329.4; 526/330; 526/343; 526/344.2
[58] Field of Search ......................................... 528/483

[56] References Cited

U.S. PATENT DOCUMENTS 2,556,260   6/1951   Downing ............................. 528/483
3,805,869   4/1974   Winter et al. ........................ 159/4 B

*Primary Examiner*—Stanford M. Levin
*Attorney, Agent, or Firm*—Millen & White

[57] ABSTRACT

The rheological properties of paste-formable, powdered polymerizates produced by polymerizing vinyl chloride or a mixture of vinyl chloride and a copolymerizable monomer in an aqueous emulsion in the presence of a water-soluble catalyst and an alkali metal salt of a fatty acid as the polymerization emulsifier and spray drying the resultant polymerizate, are improved by treating the powdered polymerizate with a gas which forms an acid in an aqueous solution.

11 Claims, No Drawings

AFTERTREATMENT OF SPRAY DRIED, POWDERED VINYL CHLORIDE EMULSION POLYMERIZATES

BACKGROUND OF THE INVENTION

This invention relates to a process for improving the rheological properties of spray dried, powdered vinyl chloride emulsion polymerizates.

It is known that polymers of vinyl chloride suitable for forming into pastes (plastisols) can be produced by emulsion polymerization employing an alkali metal salt of fatty acid as polymerization emulsifier, by conducting the polymerization in an alkaline medium, since alkali metal salts of fatty acids, which have pH values of at least 9.5 in an aqueous medium, are fully effective as emulsifiers only at such alkaline pH values.

By the polymerization in the presence of an alkali metal salt of a fatty acid as the emulsifier, polymers are obtained having a considerably improved thermal stability, compared to those polymers obtained by the polymerization in the presence of other conventional emulsifiers, such as alkyl sulfates, alkyl and alkylaryl sulfonates (see Table 1). The polymers produced with alkali metal salts of fatty acids, however, form plastisols of unsatisfactorily high viscosities. (See Comparative Examples 1 and 2).

In accordance with a prior process, plastisols of very low viscosities can be obtained from polymers of vinyl chloride produced by emulsion polymerizations employing alkaline salts of carboxylic acids as emulsifiers by reducing the pH of the polymer dispersion to pH values of 4 to 7.5 immediately before or during the spray drying step. The polymerization is conducted at a pH of 9.5 – 11.5, so that the resultant dispersion remains mechanically stable. See U.S. Application Ser. No. 703,232, filed July 7, 1976 and Fed. Rep. of Germany Laid Open Application DAS No. P 25 31 780.0, whose disclosures are incorporated by reference.

It is an object of this invention to provide a process for improving the rheological properties of vinyl chloride polymers, prepared by emulsion polymerization employing an alkali metal salt of a fatty acid as the polymerization emulsifier which does not require a pH adjustment step prior to or during spray drying of the polymerizate. Other objects will be apparent to those skilled in the art.

SUMMARY OF THE INVENTION

In a process aspect, this invention relates to a process for improving the rheological properties of powdered polymerizates formable into plastisols, produced by polymerizing vinyl chloride or a mixture of vinyl chloride and a copolymerizable monomer in an aqueous emulsion in the presence of a water-soluble catalyst and an alkali metal salt of a fatty acid as the polymerization emulsifier and spray drying the resultant polymerizate, which comprises treating the powdered polymerizate with a gas which forms an acid in an aqueous solution.

DETAILED DISCUSSION

Examples of gases which produce acids in an aqueous solution, hereinafter called acid-forming gases, are $SO_2$, $CO_2$ and preferably HCl.

Such acid-forming gases can be used as such or in mixture with a dry, inert gas, e.g., air or nitrogen.

In a preferred embodiment of the process of this invention, the treatment of the spray-dried powder with the acid-forming gas is conducted in a fluidized bed. In a particularly preferred embodiment, a mixture of an acid-forming gas and an inert gas is recycled through the fluidized bed until the acid-forming gas has been absorbed by the powdered polymerizate.

The treatment of the spray dried powder with acid-forming gas eliminates or reduces the inherent alkalinity thereof resulting from the polymerization being conducted under alkaline conditions and the polymerizate being spray dried without a pH adjustment step. Preferably, the treatment is conducted under conditions which eliminate all of this inherent alkalinity, i.e., to produce treated powders which when mixed with water, e.g., in a 50:50 mixture, have a pH of less than about 7.5, preferably about 4 to 6.

The spray-dried powder is preferably treated with 0.3–1.0 gram equivalent, preferably 0.5–1.0 gram equivalent, of an acid-forming gas per gram equivalent of the emulsifier present in the spray dried powder (which amount corresponds substantially to the amount employed in the polymerization). However, treatments employing less than 0.3 gram equivalents, produce a noticeable reduction in the viscosity of plastisols produced from the treated powder.

It will be apparent that if an excess of alkali was utilized in the polymerization, i.e., in addition to that provided by the alkali metal salt of the fatty acid employed as emulsifier, to increase the stability of the resultant dispersion, the amount of acid-yielding gas should be correspondingly increased. In such cases, it is possible to use larger amounts of acid-forming gas than 1.0 gram equivalent per gram equivalent of the emulsifier present in the spray dried powder, to achieve an even further reduction in the viscosity of plastisols produced from the treated powder. However, any additional excess of acid-yielding gas should be avoided because such excess is not absorbed by the powder, i.e., does not chemically react therewith, and consequently must thereafter be removed, e.g., by an inert gas.

The spray-dried powder can be treated according to the process of this invention, after discharge from the spray-drying tower, in a vessel or silo, with the powder being aerated from the bottom of the vessel by a stream of an inert gas. Preferably, an amount of inert gas is employed which achieves fluidization without causing excessive expansion of the powder volume within the vessel, i.e., so that excessive fluidization does not occur. The inert gas is withdrawn from the head of the vessel and recycled to the bottom thereof. A metered amount of the acid-forming gas is then introduced into the inert gas. Both gases are employed at ambient temperature (about 20° C.) and are preferably recirculated until the acid-yielding gas has been completely absorbed by the synthetic resin powder.

When conducting the treatment in a fluidized bed, any conventional apparatus can be employed, e.g., as described in "Grundriss der chemischen Reaktionstechnik," W. Brötz (1958): 92 et seq. When operating in a fluidized bed, it is preferable to first fluidize the spray-dried powder with a stream of inert gas and thereafter add the acid-forming gas to the incoming stream of inert gas, preferably in an amount of 0.5% by volume to 20% by volume, calculated on the inert gas, when HCl or $SO_2$ are employed. If $CO_2$ is employed, it can be used instead of an inert gas to fluidize the powder.

The mixture of acid-forming gas and inert gas is preferably recycled through the fluidized bed until the acid-yielding gas has been absorbed by the fluidized powder. As stated above, the amount of acid-forming gas employed depends upon the amount of emulsifier present in the powder. If all of the acid-forming gas is not absorbed during the fluidized-bed treatment, the fluidizing gaseous mixture must be displaced by inert gas until the fluidized bed is free of acid-forming gas.

The process of this invention can be employed for the preparation of plastisol-forming powdered vinyl chloride homopolymers and copolymers. Suitable comonomers are all monomers copolymerizable with vinyl chloride but preferably are those having the group —CH=C<, such as vinylidene chloride, vinyl esters of carboxylic acids, such as vinyl acetate, vinyl formate, acrylic esters, as well as unsaturated dicarboxylic acids, such as maleic acid and fumaric acid. The comonomers can be present in the polymerization charge to an extent of up to 30% by weight of the mixture of monomers.

Examples of suitable catalysts are the water-soluble compounds conventionally employed in emulsion polymerizations of vinyl chloride, e.g., water-soluble persulfates, water-soluble persulfates in combination with a reducing component, e.g., a water-soluble bisulfite, hydrosulfite, hydrazine or thiosulfate, formaldehyde sulfoxylates, hydrogen peroxide in combination with a reducing agent, e.g., bisulfite, hydrazine, hydroxylamine or ascorbic acid, as well as water-soluble persulfates in combination with hydrogen peroxide and an activating agent, e.g., copper salts which are employed in an alkaline medium with a complexing agent, e.g., a pyrophosphate.

Examples of suitable emulsifiers are Na and K salts of straight chain and branched fatty acids of 8–18 carbon atoms, e.g., sodium or potassium caprate, sodium or potassium laurate, sodium or potassium myristate, sodium or potassium palmitate, sodium or potassium stearate. Sodium laurate and sodium myristate are preferred.

The dispersions (latices) obtained after the polymerization ordinarily should contain no more than 1.0% by weight of emulsifier when the polymerization is conducted batchwise and no more than 2% when the polymerization is continuous, since high emulsifier concentrations have an adverse effect in the final products and during processing, e.g., they lower the transparency and elevate the water sensitivity, as well as the electrical values of the polymers and the articles manufactured therefrom.

The polymers also should be produced as high solids content emulsions, viz., those containing at least 45% by weight of monomers, in order to meet the requirements for economy required for a modern technical process. High monomer concentrations ensure acceptably high space-time yields in the polymerization reactor and in the spray-drying tower and also reduce the energy requirements of the spray-drying step.

A batchwise mode of operation which provides the manufacture of especially high-percentage, low-emulsifier polymer dispersons, is described in Fed. Rep. of Germany Application DAS No. 1,964,029, according to which the emulsifier is introduced during the polymerization procedure in accordance with a specific program.

The polymerization can be conducted at the usual temperatures, viz., from about 35° to 70° C., and pressures, e.g., about 5.5 bars to 13 bars.

The spray-drying step can be conducted in conventional spray-drying devices. Such equipment is described, for example, in "Ullmanns Encyclopaedie der technischen Chemie" (1951) 1 : 602 et seq. A particularly suitable process for the spray drying of vinyl chloride polymer dispersions, leading to powders having initially the particle size suitable for pastes, is described in U.S. Pat. No. 3,805,869.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

COMPARATIVE EXAMPLE 1

With the exclusion of atmospheric oxygen, 2,200 liters of demineralized water is charged into a 6 m$^3$ pressure vessel, along with a previously prepared solution of 60 g. of copper nitrate as the redox component and 1,440 g. of sodium pyrophosphate as the complexing agent for the copper nitrate in 5,000 g. of water. The batch is adjusted to pH 11.0. The reactor vessel is heated to about 56° C. and, under agitation, 700 kg. of vinyl chloride and 20.1 of activator solution (3% solution of $K_2S_2O_2$ in water) are added thereto. After onset of the polymerization, an emulsifier solution (3.5% solution of sodium laurate in water with an excess of 0.15 equivalents of NaOH, based on the lauric acid), vinyl chloride, and a 1.5% hydrogen peroxide solution are added in accordance with the following program:

| Hour | Emulsifier liter | Vinyl Chloride kg. | Hydrogen peroxide liter | Conversion % |
|---|---|---|---|---|
| 0.75 | 3 = 105 g. | 500 | 5 | 5.5 |
| 1.5 | 6 = 210 g. | 500 | 5 | 10.5 |
| 2.25 | 11 = 385 g. | 500 | 5 | 28.2 |
| 3.0 | 48 = 1680 g. | 500 | 5 | 40.7 |
| 3.75 | 134 = 4690 g. | | | 53.5 |
| 4.5 | 230 = 8050 g. | | | 62.0 |
| 5.25 | 96 = 3360 g. | | | 67.5 |

The polymerization is terminated after about 6–7 hours, thus obtaining a latex having a dry solids content of 48%. The K-value is 70 (K-value method by Fikentscher: Lunge-Berl [1934/5] : 945); the final pH is 11.0, and the surface tension is 48 dyn/cm. The emulsifier content is 0.75% by weight.

The thus-obtained dispersion is spray-dried in accordance with U.S. Pat. No. 3,805,869. A paste is formed from 60 parts by weight of the powder with 40 parts by weight of dioctyl phthalate, and the viscosity of the paste is measured after two hours employing a Haake rotary viscometer. Table 2 shows the viscosities for several shear velocities.

COMPARATIVE EXAMPLE 2

An autoclave having a capacity of 300 liters, equipped with a jacket cooler and a vane-type agitator, is charged per hour with the following:
14 liters of vinyl chloride
11.6 liters of an aqueous 2.0% sodium laurate solution
0.2 liters of 3% aqueous potassium persulfate solution
0.2 liters of a 0.5% aqueous hydrogen peroxide solution The autoclave is filled to an extent of 90%. The polymerization temperature is maintained at 46° C. Monomer conversion is approximately 90%. A dispersion is continuously withdrawn from the bottom of the container with a solids content of 49%, a pH of 9.5, a K-value of 70, and a surface tension of 37.4 dyn/cm.

The dispersion is spray-dried as described in Comparative Example 1. Table 2 gives the paste viscosity of the powder, prepared into a paste in a weight ratio of 60 : 40 with dioctyl phthalate.

EXAMPLE 1

10 kg. of powdered vinyl chloride polymer polymerized and spray-dried as described in Comparative Example 1, is introduced into a fluidized bed having a capacity of 75 liters, a diameter of 400 mm., and a height of 600 mm. By means of a fan, 20,000 l./h. of air at 20° C. is blown through the fluidized bed. The air exiting at the head of the fluidized bed is recycled to the fluidized bed. The recycled amount of air is 200 liters.

Within 15 minutes, 6 liters of HCl gas is introduced into the circulated air. Two hours later, the fluidized-bed treatment is terminated. At this point in time, less than 0.001% by volume of HCl is present in the circulating air. The viscosity of a plastisol formed from the treated powder and dioctyl phthalate at a weight ratio of 60 : 40, is given in Table 2.

EXAMPLE 2

The procedure of Example 1 is followed, except 10 liters of HCl gas is introduced within 15 minutes into the recycled air, and the fluidized-bed treatment is terminated after another two hours. The paste viscosity of the powder, made into a paste with dioctyl phthalate in a ratio of 60 : 40, is given in Table 2.

EXAMPLE 3

The method of Example 2 is employed, except the fluidized-bed treatment is continued for 4 hours after introduction of the HCl. At that time, the circulating air contains less than 0.001% by volume of HCl. Table 2 gives the paste viscosity of the powder, made into a paste with dioctyl phthalate in a ratio of 60 : 40.

EXAMPLE 4

The treatment is conducted as described in Example 1, except instead of air, carbon dioxide is used as the sole circulating gas and the fluidizing step is conducted for 8 hours. The paste viscosity of the powder made into a paste in a ratio of 60 : 40 with dioctyl phthalate is given in Table 2.

EXAMPLE 5

The polymerization is carried out as described in Comparative Example 1, except that a mixture of 95% of vinyl chloride and 5% of vinyl acetate is employed. The dispersion, obtained with a solids content of 48%, is spray-dried as described in Comparative Example 1, and the resultant powder is treated in the fluidized bed as described in Example 2. The paste viscosity of the treated powder is given in Table 2 (60 : 40 dioctyl phthalate).

EXAMPLE 6

The polymerization and spray-drying steps are conducted as described in Comparative Example 2, and the spray-dried powder is treated in the fluidized bed as described in Example 1, but with the difference that 10 liters of HCl gas is utilized. The viscosity of a 60 : 40 dioctyl phthalate paste of the treated powder is given in Table 2.

EXAMPLE 7

The method of Example 6 is employed, except that 20 liters of HCl gas is employed. The viscosity of a 60 : 40 dioctyl phthalate plastisol of the treated powder is given in Table 2.

EXAMPLE 8

The method of Example 6 is employed, except that 30 liters of HCl gas is employed and this amount is recycled for 4 hours together with the air. As shown in Table 2, the paste viscosity of the resultant powder is thereby reduced by a factor of 280, compared to the paste viscosity of the starting powder.

EXAMPLE 9

The vessel of Example 1 is charged with 20 kg. of the powder polymerized and spray-dried in accordance with Comparative Example 1. Via the bottom of the vessel, 200 liters of air is introduced into the vessel and recycled therethrough at the rate of 400 l./h.

Within 30 minutes, 20 liters of HCl gas is added to the circulating air and recycling of the air-HCl mixture is continued at 400 l./hr. for 15 hours. The paste viscosity of the thus-treated powder is given in Table 2.

Test for Thermostability

The synthetic resin powder to be tested is mixed in a porcelain dish with plasticizer and stabilizer in the following ratio:

100 parts by weight of polyvinyl chloride
30 parts by weight of dioctyl phthalate
1 part by weight of a Ba-Cd stabilizer The mixture is rolled in a rolling mill for 5 minutes and then drawn into a sheet having a thickness of 1.0 mm. Squares (18 × 18 mm.) are punched out from this sheet and subjected to a temperature load of 180° C. in a revolving Brabender heating furnace. Samples are withdrawn at intervals of 5 minutes. The thermal load can be determined from the discoloration. The time elapsed up to directly prior to the sample turning black is a measure of the thermostability thereof.

Table 1 gives the thermostabilities of polymers obtained in polymerizations conducted under otherwise identical conditions employing various emulsifiers.

TABLE 1

| Emulsifier 0.75% | Alkyl Sulfate | Alkyl-aryl Sulfonate | Sodium Laurate |
|---|---|---|---|
| Thermal Stability (Minutes) | 20 | 25 | 70 |

As can be seen from Table 1, polymers having a considerably higher thermostability are produced when alkali salts of fatty acids are employed as emulsifiers.

TABLE 2

| | Paste Viscosity*(poises) at Shear Velocities (sec$^{-1}$) of | | |
|---|---|---|---|
| | 0.3 | 1.0 | 100 |
| Comp. Example 1 | 10,000 | 3,000 | 80 |
| Comp. Example 2 | 14,000 | 4,000 | 100 |
| Example 1 | 600 | 300 | 40 |
| Example 2 | 310 | 165 | 31 |
| Example 3 | 130 | 70 | 28 |
| Example 4 | 2,500 | 1,200 | 80 |
| Example 5 | 350 | 170 | 35 |
| Example 6 | 1,000 | 450 | 70 |
| Example 7 | 250 | 150 | 50 |
| Example 8 | 50 | 38 | 38 |

TABLE 2-continued

| | Paste Viscosity*(poises) at Shear Velocities (sec$^{-1}$) of | | |
|---|---|---|---|
| | 0.3 | 1.0 | 100 |
| Example 9 | 130 | 70 | 30 |

*60 : 40 weight ratio of powder : dioctyl phthalate

As demonstrated by the results given in Table 2, the viscosities of the pastes obtained from the spray-dried powdered polymerizates can be improved by 1–2 orders of magnitude by the process of this invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for improving the rheological properties of powdered polymerizates formable into plastisols, which comprises polymerizing vinyl chloride or a mixture of vinyl chloride and a copolymerizable monomer in an aqueous emulsion in the presence of a water-soluble catalyst and an alkali metal salt of a fatty acid as the polymerization emulsifier, spray drying the resultant polymerizate to form a powder, and subsequently treating the powdered polymerizate with a gas mixture which forms an acid in an aqueous solution to effect said improvement in rheological properties wherein the acid-forming gas is present in the gas mixture at a concentration of 0.5–20% by volume.

2. A process according to claim 1 wherein the powdered polymerizate is treated with 0.3 – 1.0 gram equivalent of the acid-forming gas per gram equivalent of the emulsifier in the polymerizate.

3. A process according to claim 1 wherein the gas is HCl.

4. A process according to claim 1 wherein the powdered polymerizate is treated with a mixture of the acid-forming gas and an inert gas.

5. A process according to claim 4 wherein the inert gas is air or nitrogen.

6. A process according to claim 4 wherein the powdered polymerizate is treated with the acid forming gas in a fluidized bed.

7. A process according to claim 6 wherein the powdered polymerizate is treated with 0.3 – 1.0 gram equivalent of the acid-forming gas per gram equivalent of the emulsifier in the polymerizate, and wherein the acid-forming gas is present in the gas mixture at a concentration of 0.5 – 20% by volume.

8. A process according to claim 7 wherein the acid-forming gas is HCl and the inert gas is air or nitrogen.

9. The process of claim 1, wherein the treating gas is recirculated until it has been sufficiently absorbed by the powdered polymerizate to effect said improvement in rheological properties.

10. A process for improving the rheological properties of powdered vinyl chloride polymerizates formable into plastisols, which comprises treating the powdered vinyl chloride polymerizate with a gas mixture which forms an acid in an aqueous solution, wherein the acid-forming gas is present in the gas mixture at a concentration of 0.5–20% by volume, wherein the powdered vinyl chloride polymerizate has been produced by polymerizing vinyl chloride or a mixture of vinyl chloride and a copolymerizable monomer in an aqueous emulsion in the presence of a water-soluble catalyst and an alkali metal salt of a fatty acid as the polymerization emulsifier and spray drying the resultant polymerizate to form a powder.

11. A process for improving the rheological properties of powdered vinyl chloride polymerizates formable into plastisols, which comprises treating the powdered vinyl chloride polymerizate with a gas mixture which forms an acid in an aqueous solution, wherein the acid-forming gas is present in the gas mixture at a concentration of 0.5–20% by volume, wherein the powdered vinyl chloride polymerizate has been produced by polymerizing vinyl chloride or a mixture of vinyl chloride and a copolymerizable monomer in an aqueous emulsion in the presence of a water-soluble catalyst and an alkali metal salt of a fatty acid as the polymerization emulsifier and spray drying the resultant polymerizate to form a powder, and wherein said gas treatment is effective to remove residual surface alkalinity on the powdered polymerizate so as to provide a powdered polymerizate formable into plastisols of lower viscosities at low shear velocities than otherwise would be the case in the absence of said gas treating step.

* * * * *